(12) United States Patent
Wright et al.

(10) Patent No.: US 7,794,183 B2
(45) Date of Patent: Sep. 14, 2010

(54) BURRLESS FLEXIBLE TRACK DRILLING SYSTEM AND METHOD HAVING COUNTERWEIGHT TOOL BALANCING SYSTEM

(75) Inventors: Rodney S. Wright, Huntington Beach, CA (US); Chris J. Erickson, Garden Grove, CA (US); John J. Jimenez, Laguna Niguel, CA (US)

(73) Assignee: The Boeing Company, Chicago, IL (US)

( * ) Notice: Subject to any disclaimer, the term of this patent is extended or adjusted under 35 U.S.C. 154(b) by 903 days.

(21) Appl. No.: 11/627,220

(22) Filed: Jan. 25, 2007

(65) Prior Publication Data

US 2008/0181733 A1 Jul. 31, 2008

(51) Int. Cl.
*B23B 35/00* (2006.01)
*B23B 45/14* (2006.01)

(52) U.S. Cl. .................... 408/1 R; 408/76; 408/88; 408/103; 408/235

(58) Field of Classification Search ............. 408/1 R, 408/76–78, 87–88, 91, 95, 103, 108, 234–235; 409/178, 235, 237; 29/34 B
See application file for complete search history.

(56) References Cited

U.S. PATENT DOCUMENTS

| | | | | |
|---|---|---|---|---|
| 1,630,528 A | * | 5/1927 | Doyle | 408/111 |
| 3,216,032 A | * | 11/1965 | Hoffman | 408/241 R |
| 4,009,545 A | * | 3/1977 | Rossborough | 408/88 |
| 4,033,532 A | * | 7/1977 | Bergquist et al. | 248/660 |
| 4,329,094 A | * | 5/1982 | Cooley et al. | 408/77 |
| 4,850,763 A | * | 7/1989 | Jack et al. | 409/178 |
| 6,098,260 A | | 8/2000 | Sarh | |
| 6,357,101 B1 | * | 3/2002 | Sarh et al. | 29/407.09 |
| 6,514,018 B2 | | 2/2003 | Martinez et al. | |
| 6,796,014 B2 | * | 9/2004 | Sarh | 29/407.09 |
| 6,905,291 B2 | | 6/2005 | Day et al. | |
| 6,927,560 B2 | | 8/2005 | Pedigo et al. | |
| 7,273,333 B2 | | 9/2007 | Buttrick, Jr. et al. | |

FOREIGN PATENT DOCUMENTS

| | | | |
|---|---|---|---|
| JP | 59037006 A | * | 2/1984 |
| JP | 2002172505 A | * | 6/2002 |
| JP | 2006123111 A | * | 5/2006 |

* cited by examiner

*Primary Examiner*—Daniel W Howell
(74) *Attorney, Agent, or Firm*—Harness, Dickey & Pierce, P.L.C.

(57) ABSTRACT

A burrless, flexible track drilling system employing a counterweight tool balancing subsystem. The counterweight tool balancing subsystem provides essentially a "weightless" feel to a machining subassembly of the system that carries a drill and an electromagnet. This enables an operator to move the machining subassembly vertically with only a very minimal degree of effort being required. The machining subassembly also includes a plurality of lifting subassemblies that aid the user in lifting and lowering the electromagnet away from and toward a pair of panels on which a drilling operation is being performed. This also significantly reduces operator fatigue and contributes to a highly ergonomic system.

20 Claims, 4 Drawing Sheets

BURRLESS FLEXIBLE TRACK DRILLING SYSTEM AND METHOD HAVING COUNTERWEIGHT TOOL BALANCING SYSTEM

FIELD

The present disclosure relates to machining apparatus and methods and, more particularly, to a burrless drilling system and method that incorporates a counterweight tool balancing system. The counterweight tool balancing system makes a machining subassembly that needs to be manually positioned over an area to be machined to feel virtually weightless, thus significantly, ergonomically improving the use of the system by an operator.

BACKGROUND

The statements in this section merely provide background information related to the present disclosure and may not constitute prior art.

Burrless drilling systems have been developed by The Boeing Company for performing burrless drilling operations on aircraft fuselage components and other large structures. A burrless drilling system typically includes a pair of flexible tracks that may be secured to an outer surface of a skin panel of a fuselage portion of an aircraft. Typically the tracks are secured by suction cups to the outer surface of the skin panels. The tracks are secured adjacent an area where a splice is to be made, such as where a stringer is positioned to splice two adjacent skin panels together. The flexible tracks support a machining subassembly that may accept, or may have mounted to it, a drill or other machine tool. Also secured to the machining subassembly is an electromagnet that is used to clamp the components being machined together prior to a drilling or other form of machining operation being carried out. The electromagnet, when energized, draws a backing plate positioned on an opposite surface (i.e., the surface that would be inside the fuselage) towards the electromagnet so as to clamp the fuselage components together before the drilling or other form of machining operation begins. Such a system is disclosed in U.S. Pat. No. 7,148,776 and U.S. Pat. No. 6,905,291, both assigned to The Boeing Company. The disclosures of both of these patents are hereby incorporated by reference into the present application.

As will be appreciated, the electromagnet that is carried on the machining subassembly is a relatively heavy item, typically weighing between 30-50 lbs (13.63 kg-22.73 kg). A drill (manual or power feed) is often also carried by the machining subassembly. The drill motor often weighs between 5-10 lbs. (2.27 kg-4.55 kg). When making vertical splices, the user must lift or lower the machining subassembly to a desired position before energizing the electromagnet to clamp the components being machined together. As will be appreciated, this can require considerable effort on the part of an operator. In aircraft fuselage construction applications, typically hundreds of holes need to be drilled along a radial (i.e., vertical) splice line in accordance with a pre-positioned template that is laid over the outer surface of the fuselage skin panel. Thus, over the course of an average work day, repeatedly lifting and/or lowering the machining subassembly to precisely position the subassembly in the needed positions can be physically challenging for the worker.

Initially, just prior to beginning a drilling or machining operation, it would be preferable to be able to enable the user to lower the electromagnet into contact with the outer surface of the skin panel with only a small amount of physical effort being required from the operator. It would also be preferable to enable the electromagnet of the machining subassembly to be lifted away from the skin panel once the drilling operation is completed without the need for significant physical effort from the operator.

SUMMARY

A burrless flexible drilling system employing a counterweight balancing system and a method for implementing such a system is disclosed. In one embodiment, pair of flexible tracks are removably secured to an exterior surface of a panel. In one example disclosed herein, the panel is a skin panel that is used to form a body portion of a mobile platform, and in one specific example, a fuselage of a commercial or military aircraft or rotorcraft.

In one implementation the system includes a counterweight tool balancing system that is used to suspend a machining subassembly of a system, where the machining subassembly is supported for movement along the flexible tracks. The machining subassembly includes an electromagnet, and thus, without the counterweight tool balancing system, would require significant physical effort to move along the vertical tracks. The counterweight tool balancing system is adjusted to approximate the weight of the machining subassembly so that the machining subassembly feels almost weightless to the operator. Thus, the operator is able to reposition the machining subassembly along the vertical tracks with very little physical effort.

In one embodiment the machining subassembly also includes a plurality of lifting subassemblies that can be energized to assist the user in urging the electromagnet into contact with the outer surface of the skin panel being machined. When the lifting subassemblies are de-energized, biasing members associated with each lifting subassembly urge the electromagnet away from the outer surface of the skin panel. Thus, again very little physical effort is required on the part of the user to position the electromagnet against the skin panel, or to move the electromagnet away from the skin panel after a machining operation is completed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses.

Figure 1:
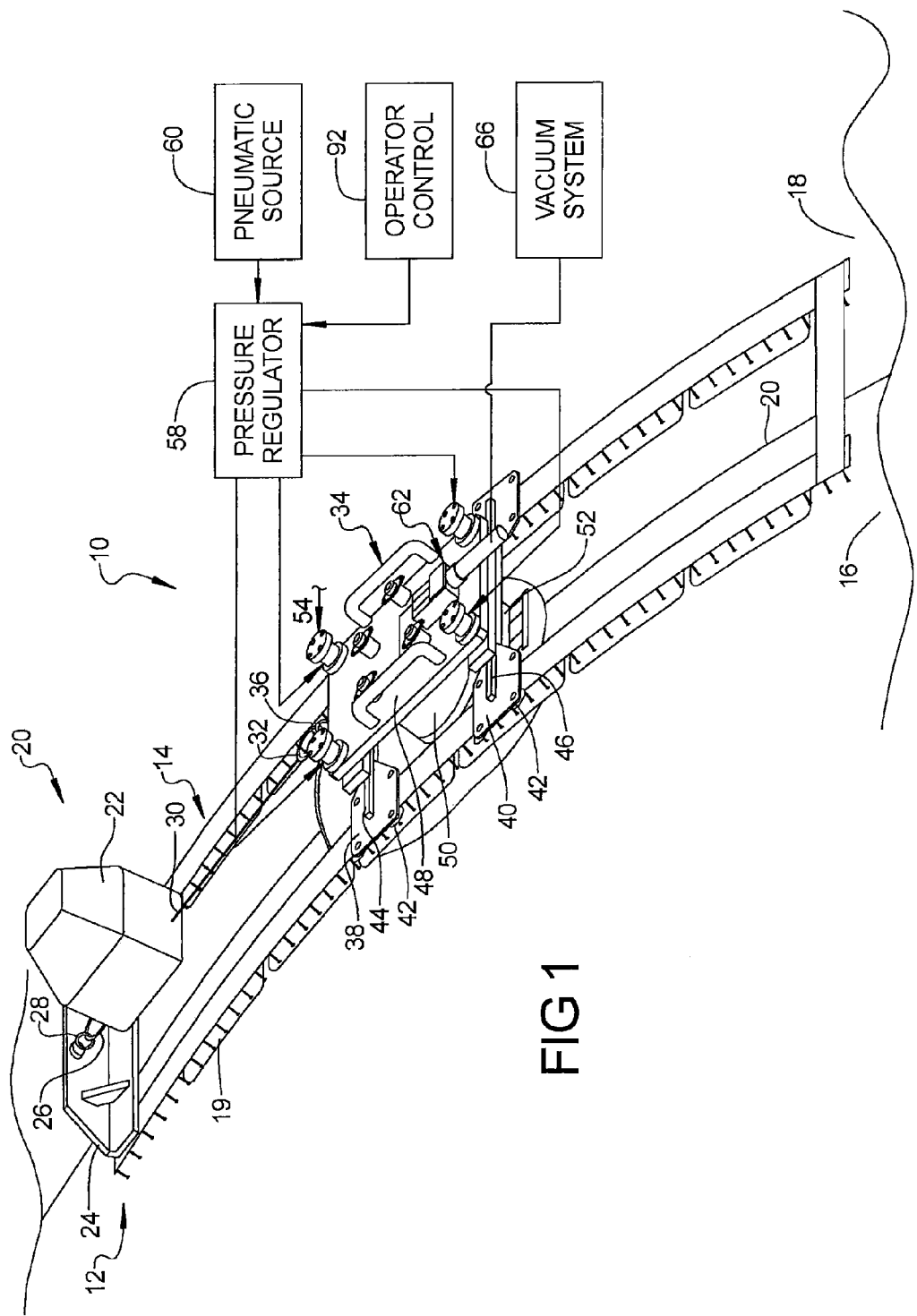
FIG. 1 is a perspective view of a portion of a fuselage of an aircraft, together with a perspective view of one embodiment of a system of the present disclosure that is used to drill holes along the fuselage, with a portion of the fuselage broken away to illustrate a backing plate used by the system.

Referring to FIG. 1, there is shown a burrless drilling system 10 incorporating a counterweight tool balancing subsystem. The system 10 may be used for a wide variety of manufacturing applications, but is especially useful for assembly operations involving fuselage construction for mobile platforms such as commercial aircraft. It will be appreciated, however, that the system 10 could be implemented for use in constructing body portions of various forms of mobile platforms. The system 10 essentially may be used in any application where precise machining operations need to be performed along a vertical axis. For the purpose of convenience, the application of the system 10, in this disclosure, will be described in connection with the assembly of a fuselage of a commercial aircraft.

Referring further to FIG. 1, the system 10 includes a pair of conventional, flexible track assemblies 12 and 14 that are secured to skin panels 16 and 18, respectively, of a fuselage 20 of a commercial aircraft. In this example the flexible track assemblies 12 and 14 are secured to the skin panels 16 and 18 by suction cups 19. The skin panels 16 and 18 are also supported on a frame member (not visible) that is positioned on the opposite surface of the skin panels 16 and 18 underneath a splice line 20 where the edges of the panels 16 and 18 meet one another.

The system 10 includes a counterweight tool balancing device 22 that is suspended from a frame member 24 via a hook 26 and an eyebolt 28. The frame member 24 is secured to the flexible track assemblies 12 and 14, although it is possible that the tool balancing device 22 could just as readily be suspended from a frame-like device that, itself, is not attached to the track assemblies 12 and 14. The tool balancing device 22 includes an extendable and retractable cable 30 that is secured via a hook 32 to an eyebolt 36 of a machining subassembly 34.

The counterweight tool balancing device 22, in one form, comprises a tool balancer that is commercially available under Part No. 6644A11 from McMaster Carr Supply Company. This component is designed to support the full weight of the machining subassembly 34 to substantially eliminate or significantly reduce operator hand and arm fatigue in positioning the machining subassembly 34. The counterweight tool balancing device 22 makes the machining subassembly 34 feel essentially "weightless" such that it can be repositioned vertically with only a very minimal amount of effort by the operator. The cable 30 (FIG. 1) allows a predetermined degree of vertical travel of the machining subassembly 34, typically at least about 6-7 feet (182.88 cm-213.36 cm).

The machining subassembly 34 includes a pair of frame members 38 and 40 that each has a plurality of four guide wheels 42 at each end thereof. Each subplurality of four guide wheels 42 engages opposite edge surfaces of a portion of one of the track assemblies 12 and 14. Thus, the entire machining subassembly 34 is supported by the four subpluralities of guide wheels 42 on the flexible track assemblies 12 and 14 and can be rolled along the flexible track assemblies 12 and 14.

The frame members 38 and 40 are secured to rails 44 and 46, respectively. The rails 44 and 46 extend generally perpendicular to the flexible track assemblies 12 and 14. The rails 44 enable a frame plate 48 supporting an electromagnet 50 to be moved linearly perpendicular to the longitudinal axes of the track assemblies 12 and 14. In FIG. 1 a backing plate 52 is also visible, which is used in connection with the electromagnet 50 to clamp the skin panels 16 and 18 to a frame member, such as stringer or doubler, before a machining operation is performed.

Figure 2:
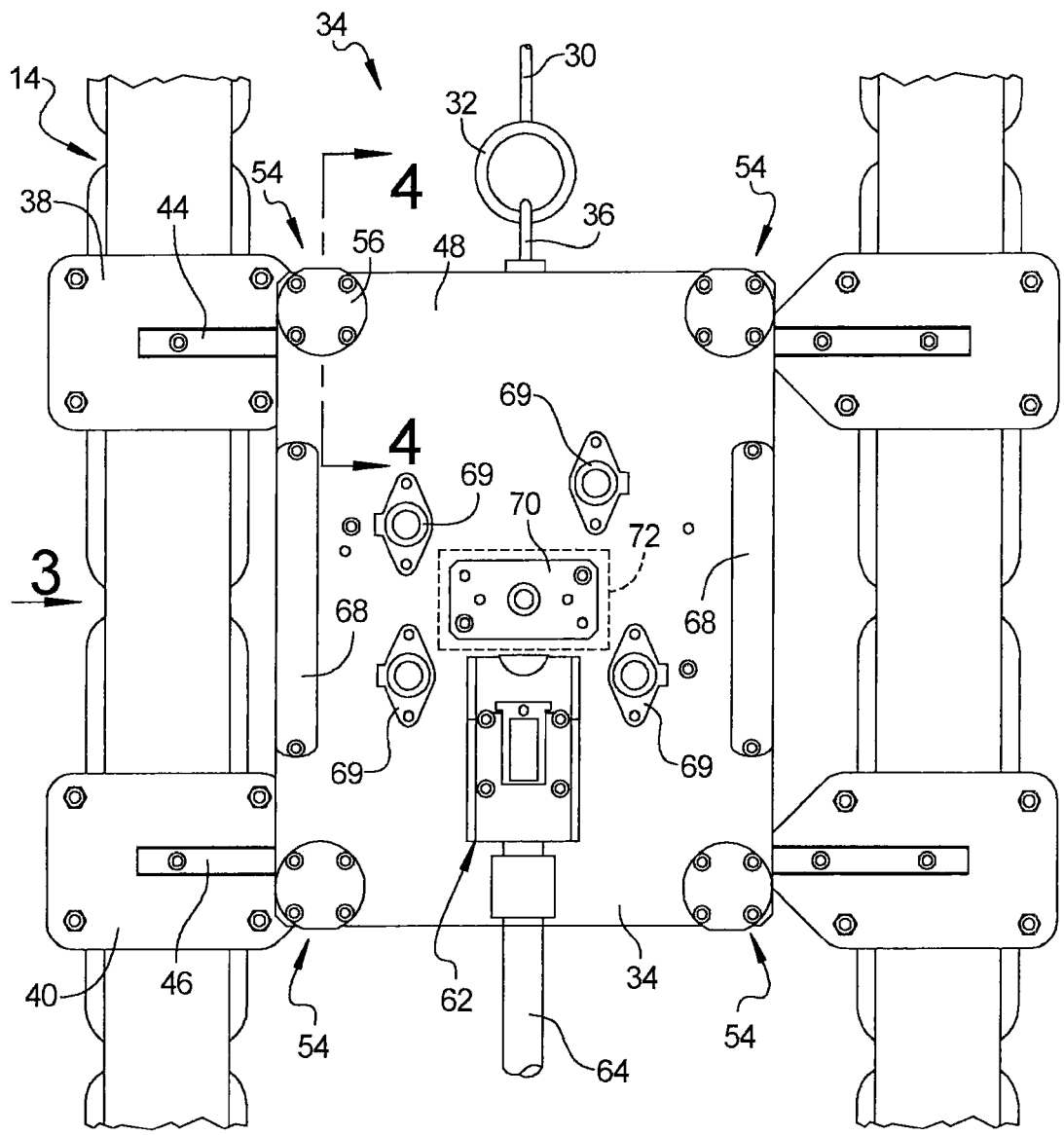
FIG. 2 is a front view of the machining subassembly shown in FIG. 1.

Referring to FIGS. 1 and 2, the machining subassembly 34 also includes a plurality of lifting subassemblies 54 at the four corners of the frame plate 48. The lifting subassemblies 54 each include a compressed air cylinder 56 that receives compressed air via a pressure regulator 58 associated with a pneumatic source 60 (FIG. 1). The frame plate 48 also is used to mount a vacuum extraction system 62 having a hose 64 coupled to a vacuum source 66. The vacuum extraction system 62 is used for extracting chips and drill shavings generated during a drill process with the assistance of a vacuum generated by the vacuum source 66. This feature is further described and illustrated in co-pending U.S. patent application Ser. No. 11/198,942, filed Aug. 5, 2005, and assigned to The Boeing Company, the disclosure which is hereby incorporated by reference.

A pair of handles 68 is secured to the frame plate 48 to aid the operator in moving the machining subassembly 34 vertically along the track assemblies 12 and 14, as well as longitudinally along the rails 44 and 46. Air accelerators 69 are used to produce bursts of pressurized air to help cool the electromagnet 50. The air accelerators 69 are also commercially available from McMaster Carr Supply Company, and are each attached to a source of compressed air via suitable conduits (not shown).

Figure 3:
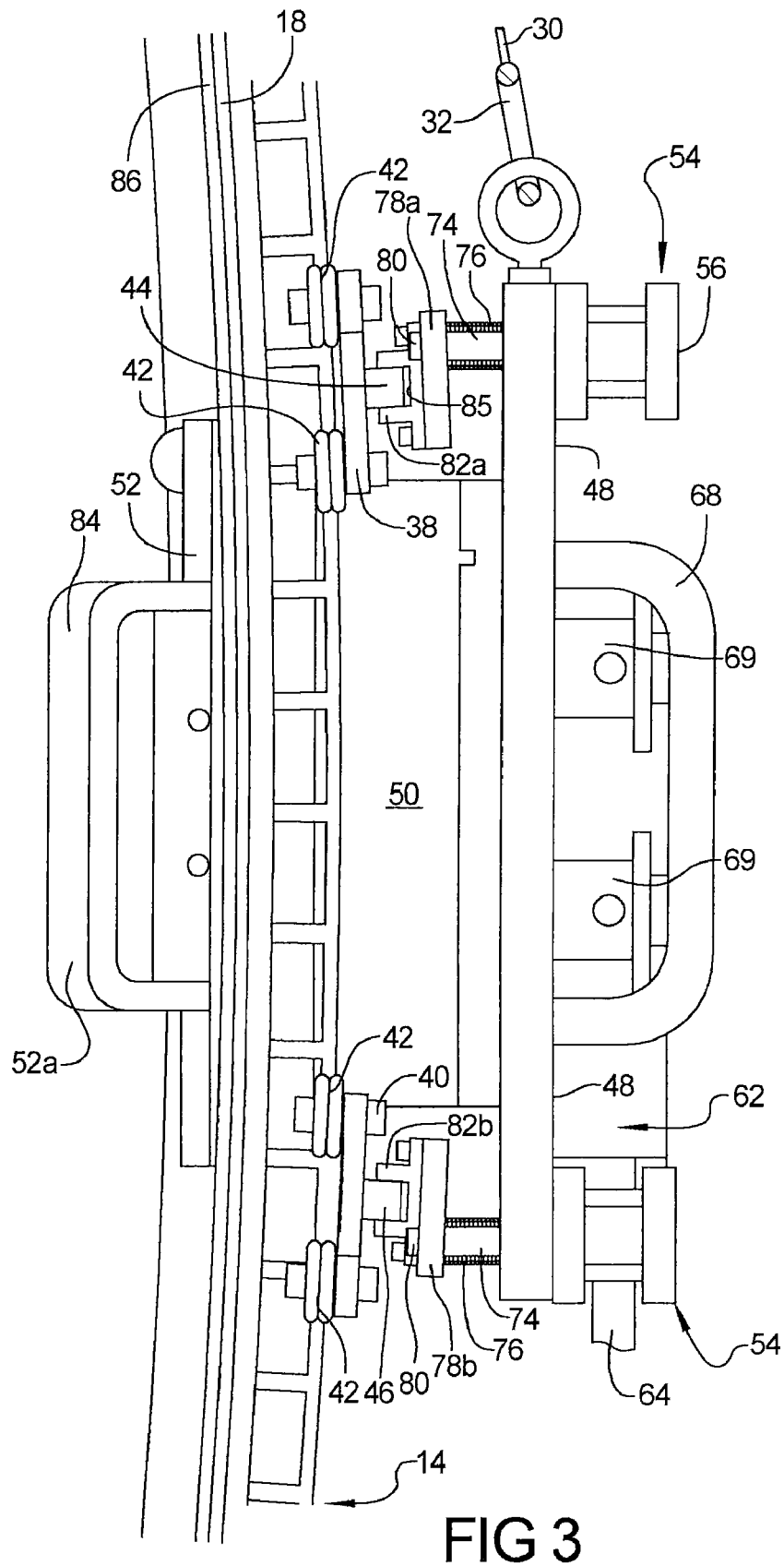
FIG. 3 is a side view of the system in accordance with directional arrow 3 in FIG. 2.

With further reference to FIGS. 1-3, a mounting plate 70 is used to mount a drill, indicated in dashed lines in FIG. 2, to the frame plate 48. The drill 72 may be a manual feed drill or may be of a "power feed" style in which the drill is advanced automatically at a predetermined feed rate during a drilling operation. However, it will be appreciated that virtually any other type of machining tool besides a drill could just as readily be supported from the mounting plate 70.

In FIG. 3 the backing plate 52 is also visible and can be seen to include at least one handle 52a, and preferably a pair of handles. The handles 52a enable the worker to position the backing plate 52 to a desired position prior to energizing the electromagnet 50, to thus enable the backing plate 52 and the electromagnet 50 to clamp the skin panel 18 and a frame component 86 together.

Figure 4:
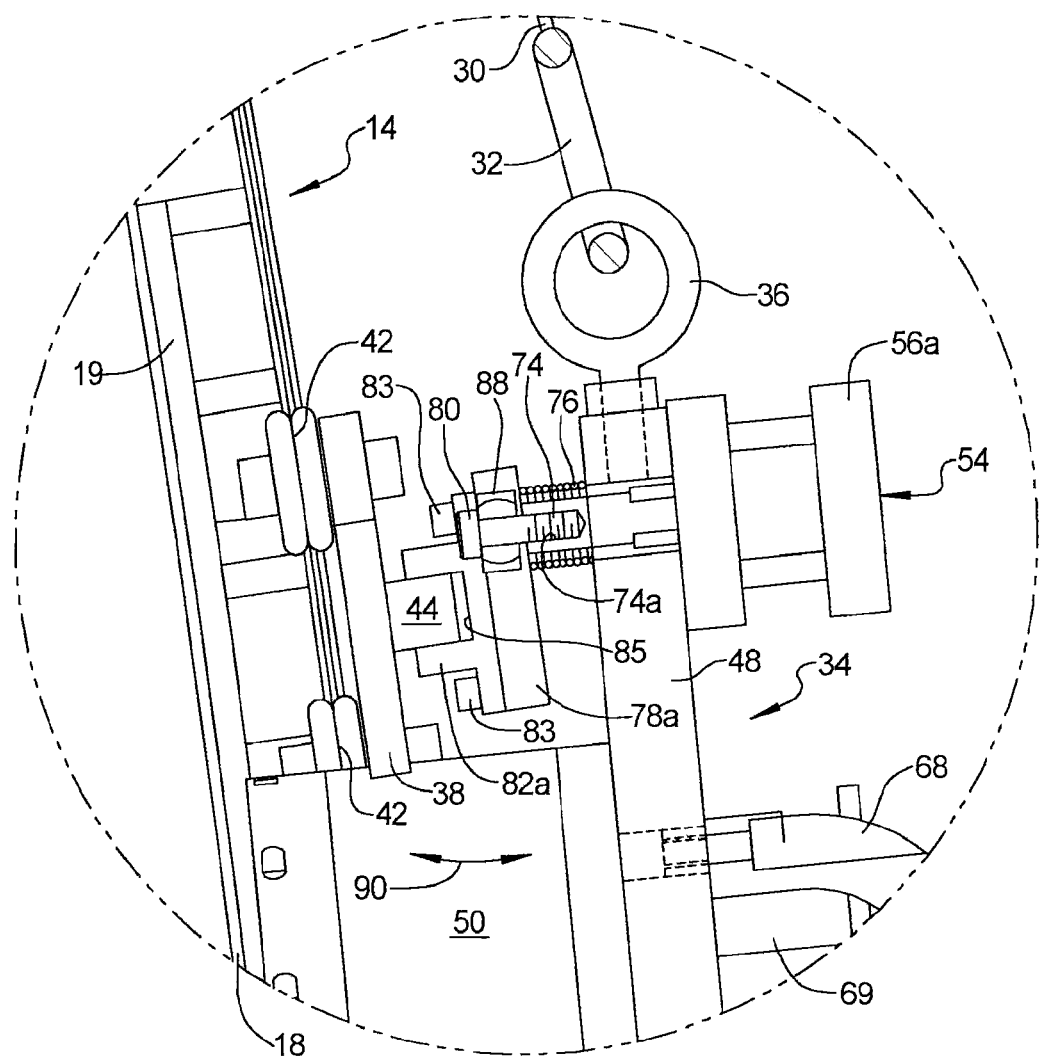
FIG. 4 is a partial, cross-sectional side view in accordance with section line 4-4 in FIG. 2 illustrating one of the lifting subsystems used to move the electromagnet towards and away from the outer surface of the skin panel.

Referring to FIGS. 3 and 4, the frame plate 48 is supported by extension studs 74 associated with each of the lifting subassemblies 54. A coil spring 76 surrounds each extension stud 74 and is positioned between the frame plate 48 and an associated mounting plate 78a or 78b. Each mounting plate 78a,78b extends generally perpendicular to the flexible track assemblies 12 and 14 such that the upper two lifting subassemblies 54 of FIG. 2 are secured to mounting plate 78a, while the lower two lifting subassemblies 54 in FIG. 2 are supported by mounting plate 78b. Each of the mounting plates 78a,78b are each secured to the frame plate 48 by a pair of threaded shoulder bolts 80 that are engaged in threaded blind holes 74a (FIG. 4) in the extension studs 74. Thus, the coil springs 76 are captured between the mounting plates 78a,78b and the frame plate 48. The length and stiffness of each of the coil springs 76 is selected so as to be able to support the entire weight of the machining subassembly 34 and to position the electromagnet 50 at a predetermined distance from the surfaces of the fuselage panels 16 and 18 when the air cylinders 56 are not being used to retract the extension studs 74.

The air cylinders 56 may comprise various designs of pneumatic cylinders, but in one preferred form, pancake tie rod air cylinders available under Part No. 1691T13 from McMaster Carr Supply Company, are used. Such "pancake" type air cylinders provide the power and stroke of tie rod cylinders but require typically less than half the space of a conventional tie rod cylinder. Such air cylinders have an air port that, when pressurized, retracts its associated extension stud 74 inwardly into a housing 56a of the air cylinder 56. If a double acting pancake style air cylinder is used, a first port will be provided and denoted as a "push" port, and a second port will be included and denoted as a "pull" port. Pressurizing the "pull" port will retract the extension stud 74 of the air cylinder 56, while pressurizing the "push" port will assist the coil springs 76 in extending the extension studs 74.

When pressurized air is applied to the air cylinders 56, this causes a portion of the length of each of the extension studs 74 to be retracted within a housing 56a of each air cylinder. This compresses each of the coil springs 76 and moves the electromagnet 50 into contact with the outer surfaces of one or both of the skin panels 16 and 18. Once the air pressure is removed the springs 76 bias the electromagnet 50 away from the outer surfaces of the skin panels 16 and 18. As described above, if double acting pancake style air cylinders are employed, then the "push" ports may be pressurized to assist the coil springs 76 in lifting the electromagnet 50. Thus, there is no requirement that the operator forcibly push on the handles 68 to manually force the electromagnet 50 into contact with the skin panels 16 and 18 before energizing the electromagnet 50. Since the operator is not required to overcome the biasing force of the coil springs 76 when moving the electromagnet into contact with the skin panel 16 or 18, this significantly reduces operator fatigue. As will be appreciated, without the lifting subassemblies 54, the operator would be required to repeatedly urge the machining subassembly 34 downwardly, via the handles 68, into contact with the skin panel 16 or 18 before energizing the electromagnet 50. In an aircraft manufacturing application, where hundreds of holes may be required to be drilled along a single vertical splice line, such manual movement of the electromagnet against the biasing force of the springs 76 could result in significant operator fatigue. The lifting subassemblies 54 virtually completely eliminate this fatigue. A suitable operator control 92 may be positioned closely adjacent the drill 72 (FIG. 2) to enable the operator to easily control the application of compressed air to each of the air cylinders 56, to thus enable a pre-load force to be applied to counter balance the weight of the electromagnet 50, and thus enable the electromagnet 50 to be moved toward and away from the fuselage panels 16 and 18 with substantially zero effort. In effect, the air pressure is adjusted to make the electromagnet 50 fuel virtually weightless to the operator as it is moved toward and away from the fuselage panels 16 and 18.

Referring further to FIG. 3, the mounting plates 78a,78b are secured to guide members 82a,82b, respectively by threaded fastening members 83. Each guide member 82a,82b includes a channel 85 that engages with an associated one of the rails 42 or 44. Thus, the guide members 82a,82b permit longitudinal sliding movement of the frame plate 48 along the rails 44 and 46.

Referring to FIG. 4, each lifting subassembly 54 also includes a commercially available spherical bearing 88 disposed around a portion of its associated shoulder bolt 80. The spherical bearing 88, which essentially forms a "ball and socket" bearing arrangement, is also commercially available from McMaster Carr Supply Company. The spherical bearing 88 enables a degree of arcuate motion in accordance with directional arrow 90 to accommodate the curvature of the skin panels 16 and 18 that form a portion of an aircraft fuselage.

In operation, an operator first positions the machining subassembly 34 vertically over a desired area where a hole is to be drilled. The hole may be demarcated by a drill template (not shown) that is positioned over the outer surfaces of the fuselage panels 16 and 18. The operator then moves the frame plate 48 longitudinally (left or right in FIG. 2) to precisely align the bit of the drill 72 over the area to be drilled. The operator then moves the electromagnet 50 into contact with the fuselage panels 16 and 18, and then actuates the electromagnet 50. The drilling operation may then be carried out by the operator. Material chips and shavings may be withdrawn by the vacuum source 66 via the vacuum extraction subsystem 62 while the drilling operation is being performed. When the drilling operation is completed, the operator then deactivates the electromagnet 50. The coil springs 76 then help bias the extension studs 74 out from their respective air cylinder housings 56a, which helps the operator to lift the electromagnet 50 away from the fuselage panels 16 and 18. The entire machining subassembly 34 may then be repositioned to drill another hole.

The system 10 thus significantly reduces operator fatigue by making the entire machining subassembly 34 virtually weightless to the operator. The counterweight tool balancing device 22 makes the machining subassembly 34 virtually weightless in the vertical direction while the air cylinders 56 and coil springs 76 make it essentially weightless along the axis of the drill bit The significant reduction in operator fatigue can also improve operator productivity as well as potentially enhance the accuracy of the drilling operation when using an electromagnet based clamping system.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for ergonomically performing burrless drilling through a pair of adjacently positioned components on a non-flat surface, the method comprising:

securing at least one track to one of said components adjacent an area where a machining operation is to be performed;

securing a machining subassembly to said track that permits said machining subassembly to move along said track;

using a counter weighting subsystem to support said machining subassembly to enable said machining subassembly to enable said machining subassembly to feel substantially weightless to an individual as the subassembly is moved along said track by an individual with a low degree of physical effort; and using said machining subassembly to clamp said components together prior to beginning said machining operation.

2. The method of claim 1, further comprising:

supporting a power tool from said machining subassembly and using said power tool to perform said machining operation.

3. The method of claim 1, further comprising using an electromagnet assembly to clamp said components together prior to beginning said machining operation.

4. The method of claim 1, further comprising:
supporting said machining subassembly for linear movement along an axis perpendicular to said track.

5. The method of claim 1, further comprising using a plurality of lifting subassemblies with said machining subassembly to support an electromagnet of said machining assembly a distance apart from an adjacent one of said components, prior to clamping said components together.

6. The method of claim 5, wherein using a plurality of lifting subassemblies comprises using a plurality of coil springs to support a portion of a weight of said machining subassembly.

7. The method of claim 6, further comprising using a plurality of pneumatic cylinders associated with said machining subassembly to apply a pre-load force that places said electromagnet subassembly in an equilibrium, thus enabling said electromagnet subassembly to feel substantially weightless to an individual as said electromagnet assembly is moved toward and away from one of said components.

8. The method of claim 1, wherein using said machining subassembly comprises using a backing plate disposed adjacent one of said components, and moveable in response to a magnetic field generated by said machining subassembly, to cooperate with a portion of said machining subassembly to clamp said components together prior to beginning said machining operation.

9. A method for ergonomically performing burrless drilling through a pair of adjacently positioned components used to form a body portion of said mobile platform, the method comprising:
securing at least one track in a vertical orientation on one of said components adjacent an area where a machining operation is to be performed;
securing a machining subassembly having an electromagnet to said track to permit said machining subassembly to be moved along said track by an individual;
using a counter weight subsystem to support said machining subassembly to enable said machining subassembly to feel substantially weightless to an individual as the subassembly is moved along said track by an individual with a low degree of physical effort; and
positioning a backing plate for movement adjacent to a surface of one of said components that is facing oppositely to a surface to which said track is secured;
positioning said machining subassembly to a desired position;
energizing said electromagnet to cause said backing plate and said electromagnet to clamp said components together; and
using a drill supported by said machining subassembly to drill a burrless hole in said components.

10. The method of claim 9, wherein using a counter weight system comprises using a counter weight system configured to suspend said machining subassembly against gravity, adjacent said components.

11. The method of claim 9, further comprising supporting said machining subsystem for linear movement along an axis perpendicular to said track.

12. The method of claim 9, further comprising securing a pair of tracks removably to one of said components, and such that said tracks are parallel to one another; and
using said pair of tracks to support said machining subassembly.

13. The method of claim 9, further comprising using said machining subassembly to support a drill thereon.

14. The method of claim 9, further comprising using said machining subassembly to support an automatic feed drill thereon.

15. The method of claim 9, further comprising using a plurality of biasing members to support said electromagnet of said machining subassembly a distance away from one of said components over which said machining subassembly is positioned.

16. The method of claim 15, further comprising:
disposing a plurality of pneumatic cylinders on said machining subassembly; and
using said pneumatic cylinders to support a weight of said electromagnet and to move said electromagnet, against gravity, to a position closely adjacent to one of said components, prior to beginning a drilling operation with said drill.

17. The method of claim 9, further comprising providing at least one handle on said machining subassembly to enable an individual to position said machining subassembly to a desired position.

18. The method of claim 9, further comprising disposing said counter weight system between a support member and said machining subassembly via a cable.

19. The method of claim 9, further comprising securing a pair of rails parallel to one another and perpendicular to said tracks, and supporting said machining subassembly from said rails for movement along an axis perpendicular to said tracks.

20. A system for ergonomically performing burrless drilling through a pair of adjacently positioned components used to form a body portion of a mobile platform, the system comprising:
at least one track arranged in a vertical orientation on one of said components adjacent an area where a machining operation is to be performed;
a machining subassembly having an electromagnet supported on said track to permit said machining subassembly to be moved along said track by an individual;
a counter weight tool balancing subsystem to support and enable said machining subassembly to feel substantially weightless to an individual as the subassembly is moved along said track by an individual with a low degree of physical effort;
a backing plate disposed adjacent to a surface of one of said components that is facing oppositely to a surface to which said track is secured;
the electromagnet being operable to use said backing plate to magnetically clamp said components together prior to beginning a drilling operation; and
a drill disposed on said machining subassembly for performing a drilling operation on said components.

* * * * *